United States Patent [19]
Sylvester et al.

[11] Patent Number: 6,160,596
[45] Date of Patent: Dec. 12, 2000

[54] BACKLIGHTING SYSTEM FOR A LIQUID CRYSTAL DISPLAY UNIT

[75] Inventors: Gail Monica Sylvester, Frankenmuth; Raymond Lippmann, Howell; Mark James Miller, Grand Blanc; Martin Lynn Adams, Flushing, all of Mich.

[73] Assignee: Delphi Technologies, Inc., Troy, Mich.

[21] Appl. No.: 09/467,397

[22] Filed: Dec. 20, 1999

[51] Int. Cl.$^7$ .................................................. G02F 1/1335
[52] U.S. Cl. .................................. 349/61; 349/62; 362/29
[58] Field of Search .................................. 349/61, 62, 63, 349/65, 69; 362/555, 84, 29

[56] References Cited

U.S. PATENT DOCUMENTS

| | | | |
|---|---|---|---|
| 4,907,862 | 3/1990 | Suntola | 350/345 |
| 4,978,952 | 12/1990 | Irwin | 340/795 |
| 5,359,345 | 10/1994 | Hunter | 345/102 |
| 5,479,275 | 12/1995 | Abileah | 359/48 |
| 6,037,922 | 3/2000 | Yagyu | 345/89 |

*Primary Examiner*—Kenneth Parker
*Assistant Examiner*—Mike Qi
*Attorney, Agent, or Firm*—Jimmy L. Funke

[57] ABSTRACT

A backlighting system for a liquid crystal display (LCD) unit includes a first number of light emitting diodes (LEDs) configured to produce saturated radiation and a second number of LEDs configured to produce desaturated radiation, wherein the saturated and desaturated radiation is combined to form a resultant desaturated radiation of a target color. In a preferred embodiment, the colors and intensities of the first and second numbers of LEDs are chosen to produce a blue-green color of a typical vacuum fluorescent (VF) display unit, whereby the LCD unit may be used to simulated a typical VF display. By utilizing the concepts of the present invention, known dispersive effects associated with the LCD unit are minimized, and a substantially uniform light output from the LCD unit results regardless of a viewing angle relative to the normal of the viewing side of the LCD unit.

20 Claims, 6 Drawing Sheets

BACKLIGHTING SYSTEM FOR A LIQUID CRYSTAL DISPLAY UNIT

TECHNICAL FIELD

The present invention relates generally to systems for illuminating visual display units, and more specifically to systems for backlighting liquid crystal display units.

BACKGROUND OF THE INVENTION

Illuminated display panels are known and commonly used for providing visual information relating to electronic equipment in general, and in particular for providing motor vehicle occupants with information relating to engine/vehicle operating conditions, climate conditions and control thereof, entertainment control, and other automotive-related functions. Early display illumination techniques involved backlighting or side-lighting a mechanically formed panel, typically via one or more incandescent lamps, wherein the panel defined a predetermined message. For example, early automotive radios typically included a mechanically actuated frequency tuning panel that defined AM and FM frequency bands. For night driving, one or more incandescent lamps were provided that served to sidelight the frequency tuning panel for increased visibility thereof. As such radios became more sophisticated and consequently included more functions, radio panels were typically formed with transparent or translucent messages that were back-lit at night to provide for visibility of such messages.

As automotive radios continued in their evolution, electronic tuning systems were introduced and alpha-numeric displays became commonplace, wherein light emitting diode (LED) systems were typically used to provide saturated (i.e., radiation which is substantially pure in color and only has a small range of spectral frequencies) alpha-numeric information relating to the presently tuned frequency. LED illumination systems in radio and other electronic systems, particularly in automotive applications, were typically replaced by vacuum fluorescent (VF) displays due to the excellent contrast and light intensities provided by such display systems.

Concomitant with advancing information technology is an increasing need to provide displays with larger arrays of pixels to produce more sophisticated images. However, large pixel arrays require high voltage power supplies, highly multiplexed VF drive schemes with expensive driver circuitry, and which tend to generate significant amounts of radio frequency interference (RFI). In an attempt to decrease display system cost and other problems associated with large pixel array VF display systems, some display system designers have begun to substitute such display systems with liquid crystal display (LCD) systems.

Most known and commercially available LCDs operate by rotating the polarization angle of light that passes through the display elements in response to a voltage impressed across each of the various display elements. Polarizing films are typically laminated to each side of a display cell, and when light passes through the first polarizer it is rotated to some degree by the liquid crystal fluid. The second polarizer then attenuates the light by an amount proportional to the alignment of the polarization angle of the light relative to the axis of the polarizing film. The resulting contrast of the LCD is the ratio of the light flux through the most transmissive state of the display elements to the light flux through the least transmissive state. Since the least transmissive state is the denominator of the contrast ratio, it dominates the ability to achieve high contrast. The least transmissive state, or "dark" state also defines a dark state color hue of the display that is easily perceived by an observer when there are many dark elements or segments, or when the background state of the display is dark. The dark state of any LCD element or background is defined as a state wherein the light impinging upon the element or background is rotated by the liquid crystal such that the polarization angle of the light reaching the second polarizer is exactly 90 degrees relative to its polarization axis, whereas the opposite light state of any LCD element or background is defined as a state wherein the light impinging upon the second polarizer is parallel with its polarization axis. In-between states; i.e., operational states between the light and dark states, are also possible as is known in the art.

In order to provide for a seamless replacement of VF displays with LCDs, the LCDs must be backlit in such a manner so as to simulate, at least as closely as possible, the blue-green color associated with typical VF display systems. Heretofore, blue colors were difficult to produce with incandescent lamps since the frequency spectrum emitted by such lamps typically contains negligible content in the blue frequency range. However, with the advent of higher frequency LED colors, it is possible to produce blue-greet VF backlight colors.

Conventional LEDs produce light that is substantially "saturated"; i.e. light that is pure in color and includes only a small range of spectral frequencies. In LCD back-lighting applications that require saturated light, one or more conventional LEDs may be provided to produce the desired illumination. In cases where the desired saturated color cannot be produced by a single LED, two or more LEDs of different colors may be chosen, whereby the ratio of intensities produced by the various LEDs may be controlled such that the resultant color is perceived to be nearly that of the target color. However, the blue-green color of a typical VF display is a "desaturated" color; i.e., color that is unpure and includes a broader range of spectral frequencies than that of a saturated color. As will be described in greater detail hereinafter, the mixing of saturated LED colors to produce a desaturated target color, such as the blue-green color associated with typical VF displays, can lead to disturbing visual effects when the resultant light interacts with a LCD.

Liquid crystal displays are known to be dispersive systems in that the degree that light is rotated through display elements for a given impressed voltage varies somewhat as a function of color. With saturated light, such dispersion is minimal in the light state as well as in between light and dark states, and when saturated light pass through a display element in the dark state, nearly all of the light will be attenuated depending upon its purity. However, when desaturated light (i.e., light containing a wide range of colors) passes through a display element, such dispersion occurs in the light and dark states, as well as in-between states. For example, in the light state, different desaturated colors will pass through the LCD elements or background at slightly different angles relative to the polarization axis of the second polarizer. Conversely, in the dark state, some colors will be highly attenuated while others will not be rotated to be exactly perpendicular to the axis of the second polarizer. Light colors that are not exactly perpendicular to the axis of the second polarizer will, to some extent, pass through the display element in its dark state. The contrast for those colors will be noticeably reduced; i.e., the dark segments will have less contrast for desaturated colors than for saturated colors, and will further have a hue corresponding to the colors that leak through the polarizer.

The degree that light is rotated through a display element also depends on the viewing angle relative to the display. In general, variations in the rotation of the polarization angle with respect to off-normal viewing angles relative to the display are not symmetric and can be quite pronounced, wherein such variations are typically very dispersive in nature.

Heretofore, desaturated colors for LCD back-lighting have been produced by mixing light emitted by saturated LEDs (i.e., spectrally "pure" colors) in proportions such that the resultant color matches the target backlight color. One known system 10 for back-lighting a LCD unit via a mixture of saturated LEDs is illustrated in FIG. 1. Referring to FIG. 1, a side elevational view of a known LCD unit 12 is shown including a back-lighting unit 14 having a number, N, of saturated LEDs $16_1$–$16_N$ suitably mounted to emit radiation toward a back panel of LCD unit 12. In system 10, the LEDs $16_1$–$16_N$ may, for example, be chosen to be two groups of LEDs each emitting different saturated colors. The two colors are typically chosen so that they lie on a line on a known CIE chromaticity diagram (hereinafter "CIE color chart") that contains therebetween the coordinates of the target color. The ratio of the distance from the target color to the two colors of the associated with the two groups of LEDs is monotonically related to the intensity of light needed by each group in order to properly mix to form the target color. An example of such a CIE color chart illustrating a known technique for producing a blue-green VF-type light color using two sets of different color saturated light producing LEDs is illustrated in FIG. 2.

Referring to FIG. 2, a color boundary 30 identifies pure saturated frequencies, and the desaturated colors are found more toward the center of the bounded region. Most LED colors lie close to boundary 30, and to produce a desaturated color near the middle of the bounded region using saturated LEDs, at least two saturated LED colors must be chosen that are on substantially opposite sides of the chart, wherein the two colors are typically in chromatic contrast with each other. In the example illustrated in FIG. 2, a number of red LEDs and a number of blue-green LEDs are chosen to produce a resultant blue-green color closely resembling a VF display, wherein the red and blue-green LEDs each produce saturated radiation. The color coordinates of each set of LEDs operated independently establish the endpoints of the color line (marked RED LED and BLUEGREEN LED), wherein the target color corresponds to x=0.26, y=0.45. The coordinates of the mixture (marked RESULTANT COLOR) is extremely close to the target color, wherein the mixture illustrated in FIG. 2 was achieved by adjusting the current through each of the LEDs; i.e., by adjusting the ratio of the number of red LEDs to the number of blue-green LEDs. This known adjustment techniques allows the resultant color coordinate to be manipulated along the color line that connects the blue-green and red LEDs, thereby enabling close matching of the color mixture with the target color. In FIG. 2, the RESULTANT color was achieved by running a current of 5 mA through 2 red LEDs and 18 mA through 4 blue-green LEDs.

Since the frequencies of LED colors from opposite sides of the boundary 30 vary significantly from each other, dispersion through the LCD can consequently be quite large. The net effect of using such a light mixture for back-lighting a LCD is that the color of the various segments, particularly in their light state, may noticeably vary at different viewing angles relative to an angle normal to the display. For example, the light from LEDs of one color may pass through the element or background in one direction while the light from LEDs of the other color may pass through in a different direction. In some situations, the variations in viewing angle from one eye to the other may be such that each eye perceives a different hue, wherein such a condition can be very disturbing to the viewer. The goal of maintaining color harmony in motor vehicle applications is frustrated when displays appear to be different colors when viewed from different angles.

A primary reason for this phenomenon may be seen with reference to FIG. 3 which illustrates a spectral waveform 32 of relative light intensity vs. wavelength for the red/blue-green LED mixture of FIG. 2. Referring to FIG. 3, waveform 32 indicates two distinct spectral peaks 34 (corresponding to the blue-green LEDs emitting light at approximately 500 nm) and 36 (corresponding to the red LEDs emitting light at approximately 640 nm). Although light emitted by the red and blue-green LEDs is suitably mixed prior to transmission through the LCD polarizers and the resultant color therefore closely resembles the characteristic blue-green color of typical VF displays when the LCD is viewed perpendicular to its display, each of the dominant peaks 34 and 36 are very discernable when the display is viewed at off-angles. For example, referring to FIG. 4 which shows perspective view of a group of display segments 18 of a LCD unit 12, the red/blue-green LED mixture of FIG. 2 may produce the characteristic blue-green color of a typical VF display when viewed along axis 20 normal to the display. However, if LCD unit 12 comprises a portion of an automotive radio display positioned in the center of the dash, the segment group 18 may appear bluish to the driver viewing the display at an angle ( relative to axis 20 (e.g., along axis 22), but may appear reddish to a passenger viewing the display at an angle β relative to axis 20 (e.g., along axis 24).

One way to reduce the foregoing color variation problem is to mix three or more LED colors to form a resultant desaturated color. However, as the number of colors increases, so to does the ability to accurately control the intensities of the component colors over normal operating temperatures to thereby maintain a target color. Moreover, tuning the mixture of three or more colors during component manufacture to compensate for differences in the light production efficiencies of individual LEDs may be prohibitively difficult.

Cost is typically a significant design factor when utilizing LEDs to back-light LCD units. In terms of lumens per dollar, LEDs emitting longer wavelengths (e.g., red to yellow) are currently the least expensive while LEDs emitting shorter wavelengths (e.g., blue-green) are significantly more costly by comparison. Accordingly, it is commonplace to design LED-based LCD backlighting systems for simulating VF display colors by using as many of the longer wavelength LEDs as possible and then pulling the color coordinates to the target color value by using the least amount of the shorter wavelength LEDs. This conventional approach typically leads to the use of red and yellow LEDs to produce most of the lumens for desaturated target colors while adding as few as possible blue-green LEDs to achieve the desired target coordinates. This approach, however, also leads to the various problems and undesirable effects described hereinabove. What is therefore needed is an improved LED-based LCD back-lighting system that does not suffer from the drawbacks of known LED-based LCD back-lighting systems. Such an improved system should preferably be both cost efficient and simple to manufacture.

SUMMARY OF THE INVENTION

The foregoing shortcomings of the prior art are addressed by the present invention. In accordance with one aspect of the present invention, a backlighting system for a liquid crystal display unit comprises a first number of light emitting diodes configured to emit saturated radiation, a second number of light emitting diodes configured to emit desaturated radiation, and driver circuitry operable to drive the first and second numbers of light emitting diodes to thereby produce composite desaturated radiation near a target color.

In accordance with another aspect of the present invention, a backlighting system for a liquid crystal display (LCD) unit comprises a LCD unit including a viewing side, an opposite back side and a number of display elements therebetween, a first number of light emitting diodes (LEDs) configured to emit radiation toward the back side of the LCD unit, and a second number of LEDs configured to emit radiation toward the back side of the LCD unit. The radiation emitted by the first and second numbers of LEDs combine to form composite desaturated radiation near a target color, wherein the composite desaturated radiation is transmitted through selected ones of the number of display elements and maintains a substantially uniform color therethrough regardless of a viewing angle relative to the viewing side of the LCD unit.

In accordance with yet another aspect of the present invention, a method of backlighting a liquid crystal display unit comprises the steps of providing a first number of light emitting diodes operable to emit saturated radiation, providing a second number of light emitting diodes operable to emit desaturated radiation, and directing the saturated radiation from the first number of light emitting diodes and the desaturated radiation from the second number of light emitting diodes toward a liquid crystal display unit to thereby provide backlighting therefore.

One object of the present invention is to provide backlighting for a liquid crystal display unit that closely matches the color of radiation produced by a vacuum fluorescent display.

Another object of the present invention is to provide backlighting near a specified color for a liquid crystal display unit wherein the color of the radiation transmitted therethrough is substantially uniform regardless of the viewing angle relative to the viewing panel of the liquid crystal display unit.

These and other objects of the present invention will become more apparent from the following description of the preferred embodiment.

BRIEF DESCRIPTION OF THE DRAWINGS

The present invention will now be described, by way of example, with reference to the accompanying drawings, in which.

DESCRIPTION OF THE PREFERRED EMBODIMENT

In accordance with the present invention, a system for producing desaturated LED-based backlighting for liquid crystal displays utilizes a number of LEDs producing saturated radiation along with a number of LEDs producing desaturated radiation to produce a target desaturated color such as, for example, the blue-green color typically associated with known VF-displays. Due to a broad range of frequencies present in the resultant light, the undesirable dispersive effects of the LCD discussed in the BACKGROUND section are much less, if at all, noticeable.

Figure 1:
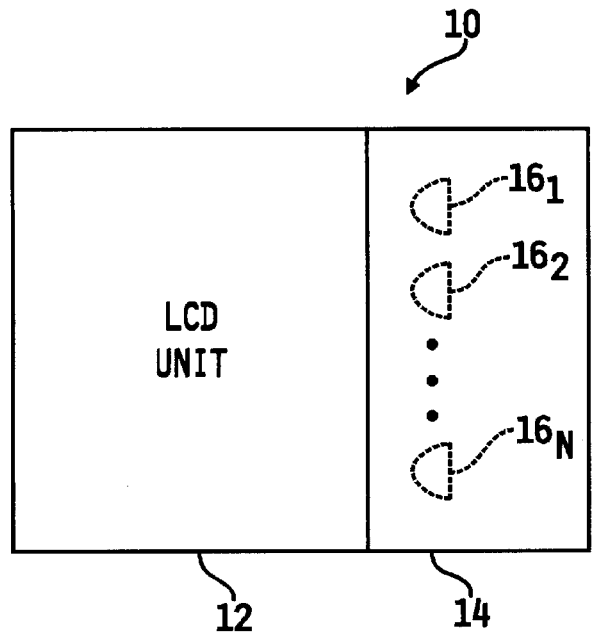
FIG. 1 is a side elevational view of a known LCD unit and LED-based backlighting system therefore.
Figure 4:
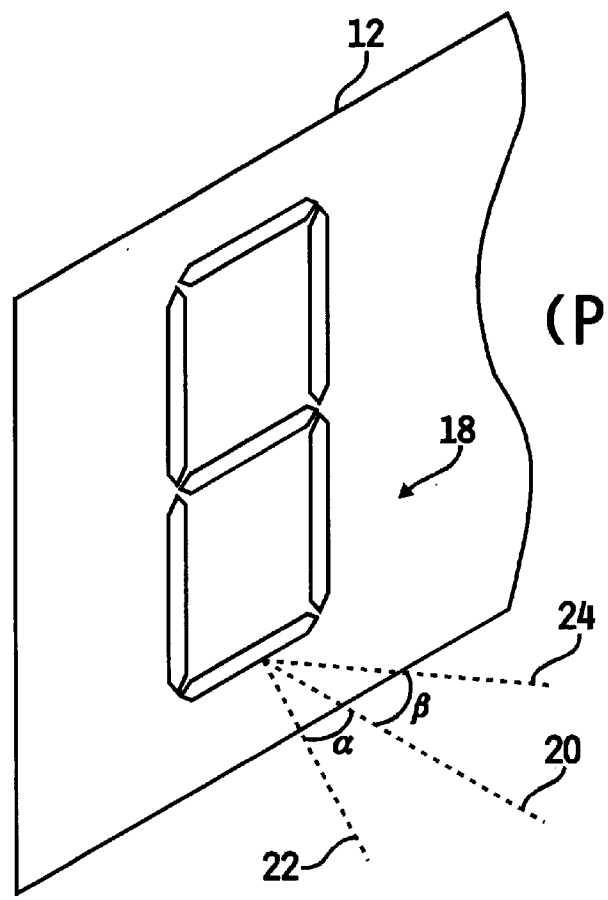
FIG. 4 is a perspective view of a group of segments forming a portion of a liquid crystal display panel illustrating known drawbacks associated with off-angle viewing of the panel when using the LED mixture of FIG. 2.
Figure 2:
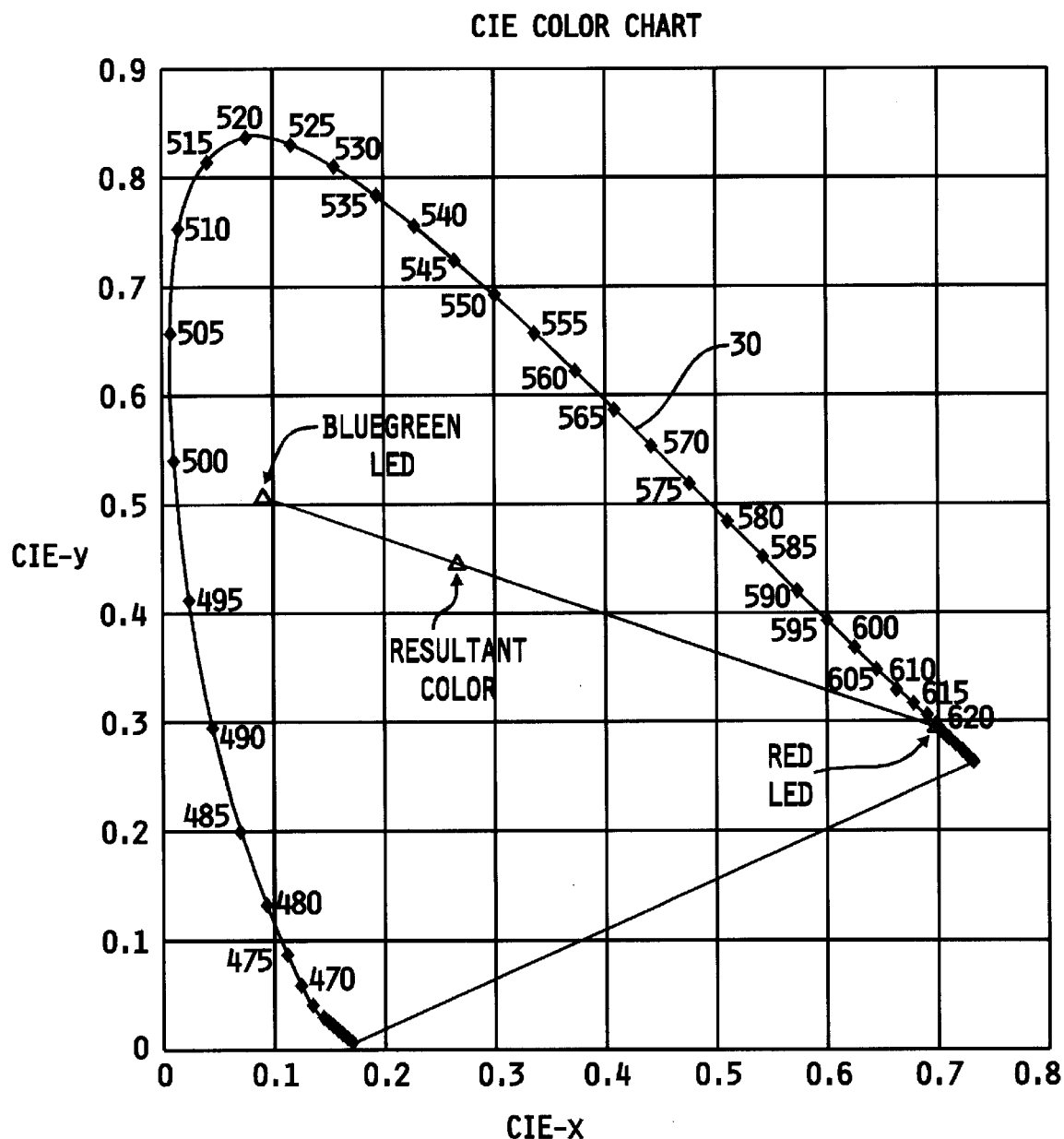
FIG. 2 is a CIE color chart illustrating an example of one known technique for producing light having a blue-green color characteristic of a typical VF display using a number of different color saturated LEDs.
Figure 5:
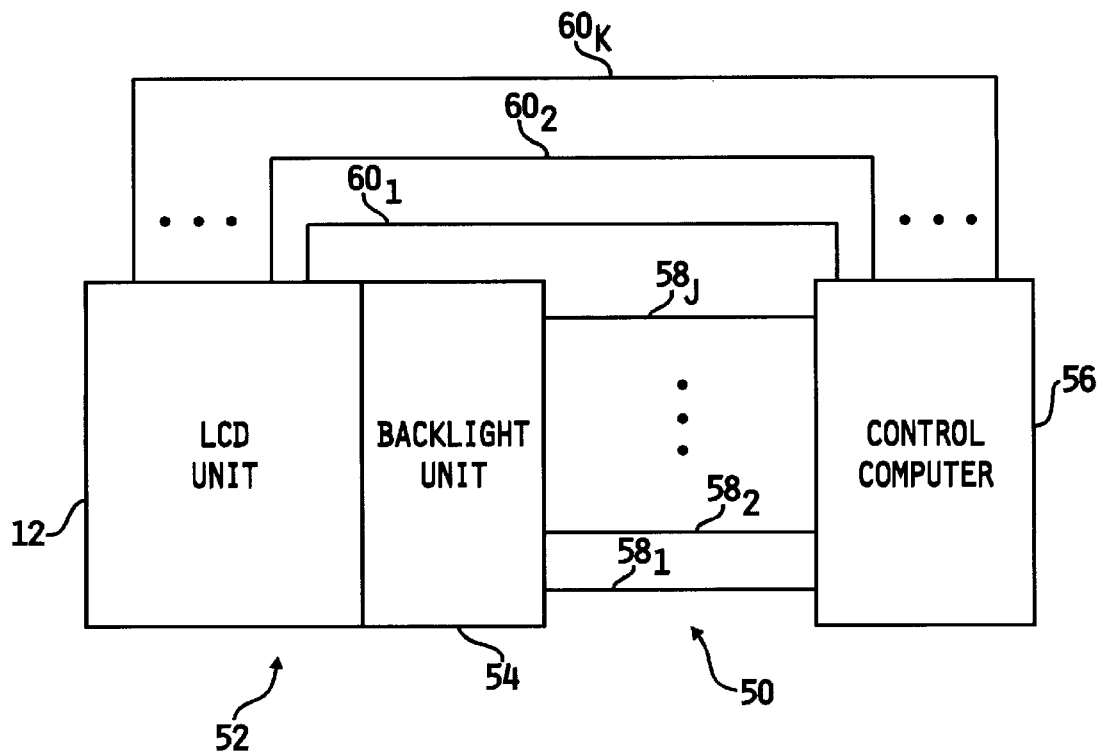
FIG. 5 is a block diagram of one preferred embodiment of an LED-based backlighting system for a liquid crystal display unit, in accordance with the present invention.

Referring now to FIG. 5, one preferred embodiment of an LED-based system 50 for backlighting a LCD unit with desaturated radiation, in accordance with the present invention, is shown. System 50 includes a LCD and backlighting unit 52 including a LCD unit 12 of known construction having a viewing side 12a and a backside 12b, wherein LCD unit includes a display panel therebetween (not shown in FIG. 5) defining a number of display elements or segments as known in the art and as shown by example (18) in FIG. 4. Unit 52 further includes a backlight unit 54, wherein unit 54 includes a known housing and structural connection to LCD unit 12 as well as a number of LEDs, in accordance with the present invention as will be described in greater detail hereinafter, wherein the LEDs are suitably mounted to direct radiation emitted therefrom toward the back side 12b of the LCD unit 12. System 50 further includes a control computer 56 having a number, J, of control lines or signal paths $58_1$–$58_J$ extending into backlight unit 54, and a number, K, of control lines or signal paths $60_1$–$60_K$ extending into LCD unit 12, wherein J and K may each be any positive integer greater than one. In one preferred embodiment, control computer 56 is microprocessor-based and includes on-board memory as is known in the art, although control computer 56 may be any known control circuit sufficiently configured to control the operation of LCD unit 12 and to further control the operation of a number of LEDs housed within backlight unit 54. In any case, control computer 56 is operable to provide appropriate signals on signal paths $60_1$–$60_K$ to thereby control the operational states of the various LCD elements or segments as described in the BACKGROUND section and as is known in the art. Control computer 56 is further operable to provide appropriate signals on signal paths $58_1$–$58_J$ to thereby control the operational states of the various LEDs housed within the backlight unit 54 as is known in the art.

Figure 6:
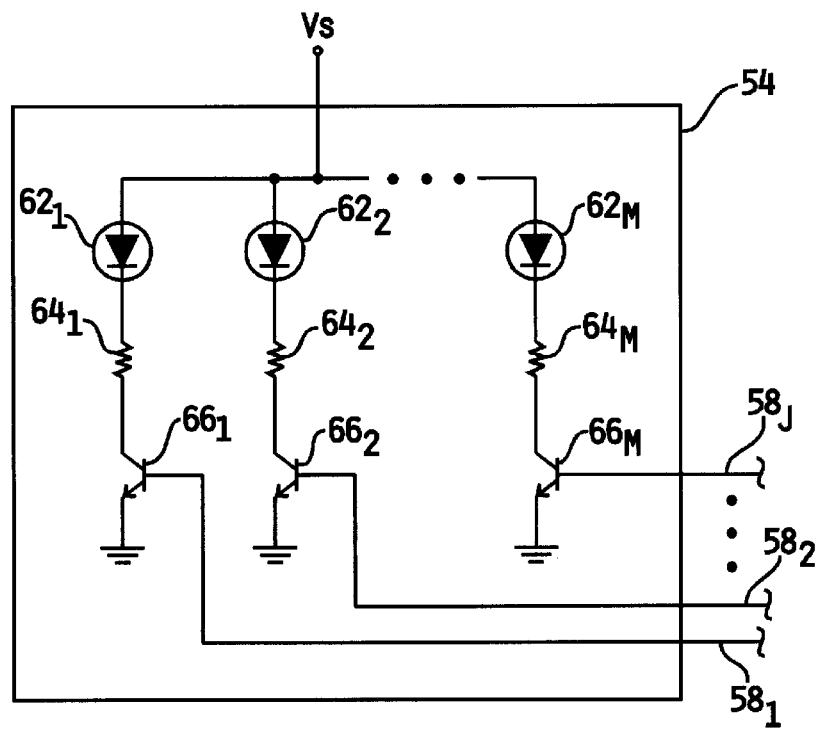
FIG. 6 is a schematic diagram illustrating one preferred technique for controlling the operation of the LEDs as well as the individual intensities thereof.

Referring now to FIG. 6, one preferred embodiment of the electrical structure of backlight unit 54, in accordance with the present invention, is shown. Backlight unit 54 includes a number, M, of light emitting diodes (LEDs) $62_1$–$62_M$, wherein M may be any integer. Preferred structures and types of $62_1$–$62_M$ will, in accordance with the present invention, be described more fully hereinafter. The anodes of the various LEDs $62_1$–$62_M$ are connected to a suitable voltage source $V_S$, wherein each corresponding cathode is connected to one end of a separate one of a corresponding number of resistors $64_1$–$64_M$. The opposite ends of the resistors $64_1$–$64_M$ are each connected to a collector of a separate one a corresponding number of bipolar transistors $66_1$–$66_M$. The emitters of transistors $66_1$–$66_M$ are preferably set to ground potential or some other reference potential, and the bases of transistors $66_1$–$66_M$ are connected to corresponding signal paths $58_1$–$58_J$. The strength of the voltage source $V_S$ and the values of each of the resistors $64_1$–$64_M$ are, in accordance with the present invention, chosen in such a manner so as to establish a desired current through the corresponding LEDs $66_1$–$66_M$, therefore establishing desired output intensities of the radiation produced thereby. Those skilled in the art will recognize that transistors $66_1$–$66_M$ may alternatively be junction field effect transistors (JFETs), metal oxide semiconductor field effect transistors (MOSFETs), insulated gate bipolar transistors (IGBTs), or other known controllable switching devices, whereby control computer 56 or other known switching circuitry is operable to control the operation of such switching devices to thereby control the operation of LEDs $62_1$–$62_M$.

In accordance with the present invention, LEDs $66_1$–$66_M$ preferably include a first number of LEDs producing saturated radiation and a second number of LEDs producing desaturated radiation, wherein radiation emitted by the two separate groups of LEDs is mixed at the back side 12b of the LCD unit 12 to produce a target color. Because the resultant radiation consequently includes a broad range of frequencies, the dispersive effects of LCD unit 12 described in the BACKGROUND section are averaged out and therefore less noticeable. In one embodiment, LCD unit 12 is preferably operated in a so-called "negative" mode in that the background of the display is maintained in a dark state while the various LCD elements or segments are controlled to allow passage of light from LEDs $66_1$–$66_M$ therethrough for reading of the display to thereby simulate a VF display system typically used in an automotive environment. Those skilled in the art will, however, recognize that LCD unit 12 may alternatively be operated in a so-called "positive" mode whereby the background is maintained in a light state while the various LCD elements or segments are controlled to their dark states to formulate readable information, and that the concepts of the present apply equally to either operational mode.

In one preferred embodiment, the number of LED producing desaturated radiation are known phosphor-doped LEDs. Phosphor-doped LEDs convert higher frequency radiation to lower frequency radiation to thereby produce highly desaturated radiation having coordinates lying in, or near, the middle section of the CIE plot. The present invention contemplates, however, utilizing LEDs fabricated in accordance with other known techniques for producing desaturated radiation.

Figure 7:
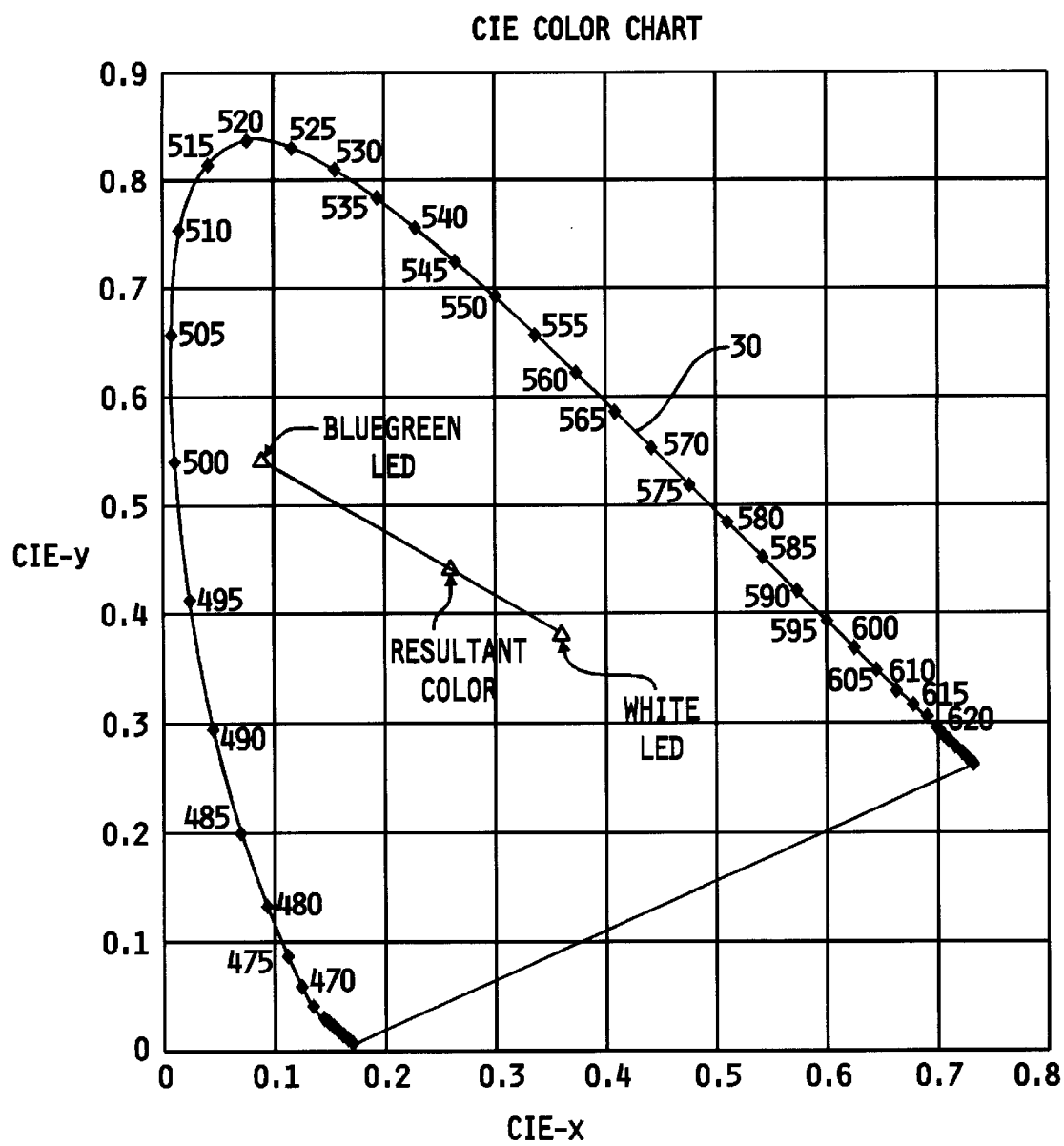
FIG. 7 is a CIE color chart illustrating an example of one preferred technique for producing desaturated light for use in back-lighting a LCD unit, in accordance with the present invention.

As a specific example of the concepts of the present invention, a first group of the LEDs $66_1$–$66_M$ producing saturated radiation and a second group of the LEDs $66_1$–$66_M$ producing desaturated radiation were chosen to produce resultant desaturated radiation near a blue-green color typically associated with known VF display units. Referring to FIG. 7, a CIE color chart is shown illustrating that the first group of LEDs producing saturated radiation are blue-green LEDs of known construction, and the second group of LEDs producing desaturated radiation are phosphor-doped LEDs producing white colored radiation. More specifically, the first group of LEDs $66_1$–$66_M$ producing saturated radiation include, in this example, 3 blue-green LEDs wherein the corresponding resistors $64_1$–$64_M$ are chosen to establish 17.5 mA flowing therethrough. The second group of LEDs $66_1$–$66_M$ producing desaturated radiation include, in this example, 5 white LEDs wherein the corresponding resistors $64_1$–$64_M$ are chosen to establish 20 mA flowing therethrough.

Figure 3:
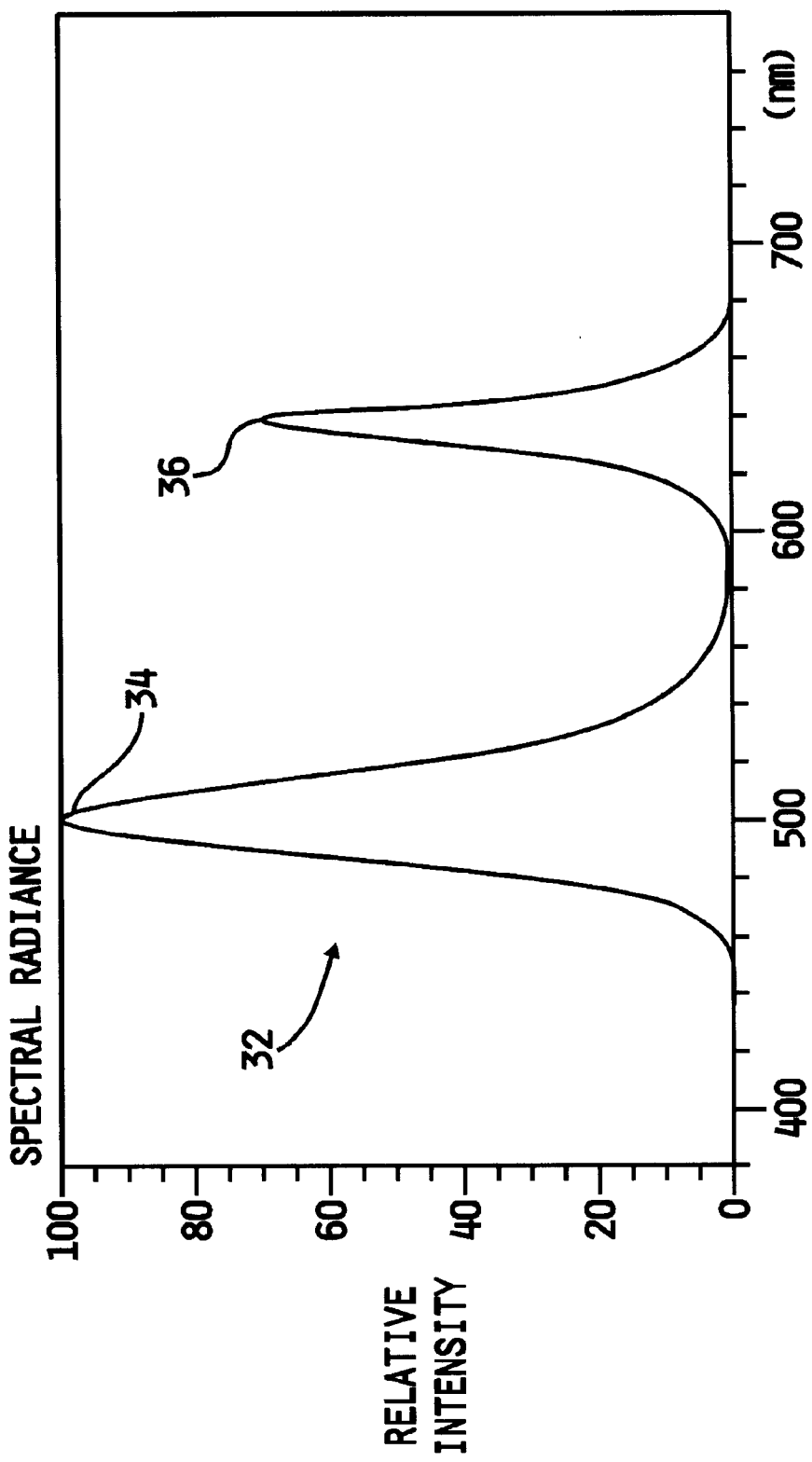
FIG. 3 is a plot of a spectral waveform illustrating the color spectrum associated with the LED mixture of FIG. 2.
Figure 8:
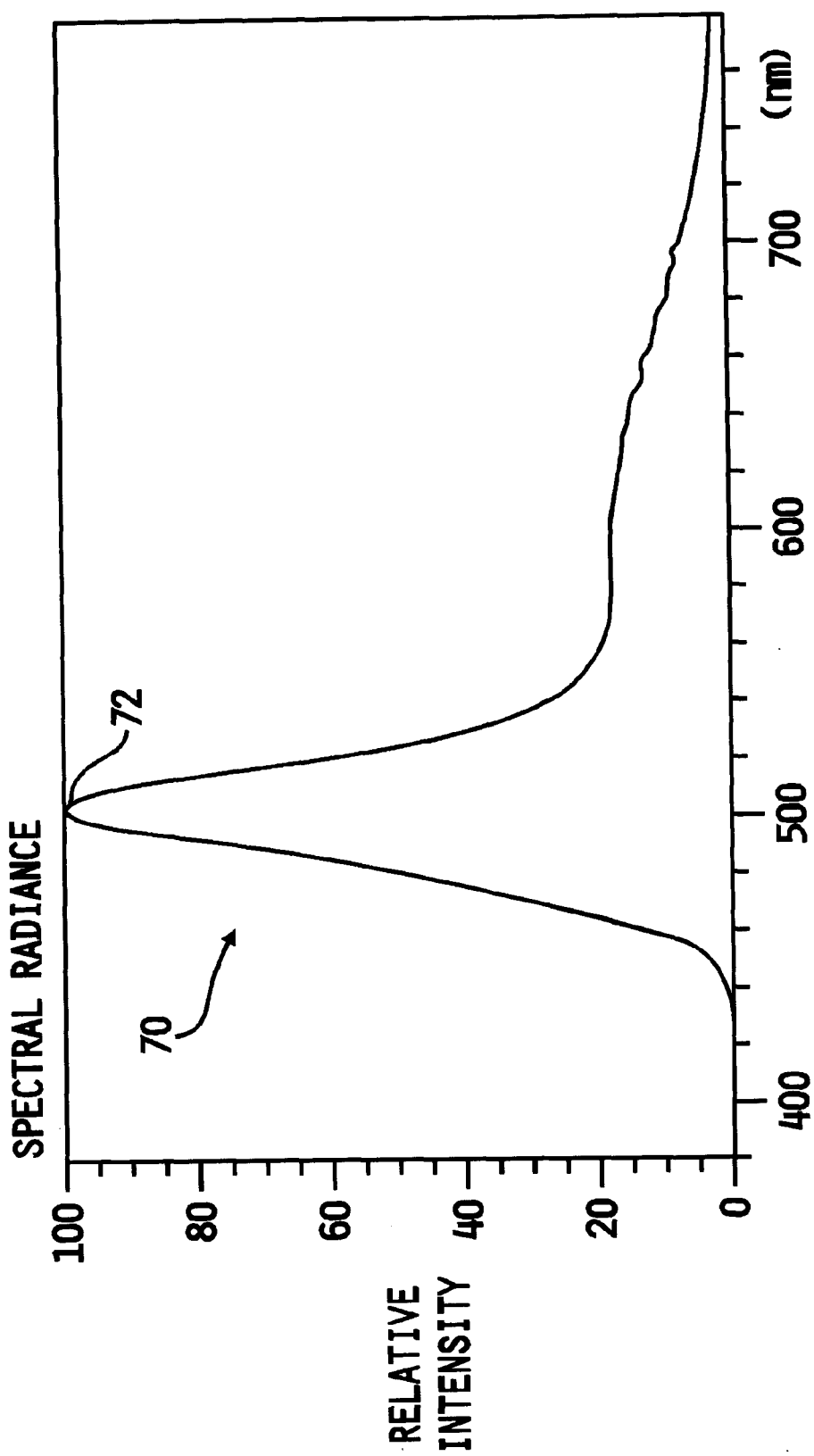
FIG. 8 is a plot of a spectral waveform illustrating the color spectrum associated with the LED mixture of FIG. 7.

Referring to FIG. 8, a spectral radiance plot 70 of relative intensity vs. wavelength for the foregoing composition of LEDs $66_1$$66_M$ is shown. Unlike plot 32 of prior art FIG. 3 wherein two distinct spectral peaks 34 and 36 were observed when mixing radiation from two different-colored sources of saturated radiation to produce desaturated radiation of the target blue-green color, plot 70 of FIG. 8 exhibits only one distinct spectral peak 72. Because of this single peak in plot 70, light emanating through the various segments of LCD unit 12 appears substantially uniform regardless of the viewing angle relative to the normal of the viewing side 12a of LCD unit 12.

From the foregoing, it should now be apparent that by utilizing the concepts of the present invention, desaturated radiation of a target color can be produced by combining radiation produced by LEDs emitting saturated radiation and LEDs emitting desaturated radiation, wherein the resultant radiation may be passed through LCD segments with negligible influence from the dispersive effects thereof. The single distinct spectral peak resulting from such a combination accordingly produces a more aesthetically pleasing display appearance, particularly when viewed from off-angles relative to the normal of the viewing side 12a of LCD unit 12.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected.

What is claimed is:

1. A backlighting system for a liquid crystal display unit comprising:
   a first number of light emitting diodes configured to emit saturated radiation;
   a second number of light emitting diodes configured to emit desaturated radiation; and
   driver circuitry operable to drive said first and second numbers of light emitting diodes to thereby produce composite desaturated radiation near a target color.

2. The backlighting system of claim 1 further including a liquid crystal display unit disposed adjacent said first and second numbers of light emitting diodes, said first and second numbers of light emitting diodes directing said saturated and desaturated radiation toward said liquid crystal display unit to thereby backlight said liquid crystal display unit.

3. The backlighting system of claim 2 wherein said liquid crystal display unit includes a number of display elements;
   and further including a control computer operable to control a display status of each of said number of display elements.

4. The backlighting system of claim 3 wherein said driver circuitry includes a number of control inputs;
   and wherein said control computer is operable to provide a control signal to each of said number of control inputs of said driver circuitry to thereby control operation of said first and second numbers of light emitting diodes.

5. The backlighting system of claim 1 wherein said target color is a desaturated blue-green color of a vacuum fluorescent display.

6. The backlighting system of claim 1 wherein said second number of light emitting diodes are phosphor doped light emitting diodes.

7. The backlighting system of claim 6 wherein said second number of light emitting diodes are operable to emit white colored radiation.

8. The backlighting system of claim 7 wherein said first number of light emitting diodes are operable to emit blue-green colored radiation.

9. A backlighting system for a liquid crystal display (LCD) unit comprising:
   a LCD unit defining a viewing side, an opposite back side and a number of display elements therebetween;
   a first number of light emitting diodes (LEDs) configured to emit saturated radiation towards said back side of said LCD unit; and
   a second number of LEDs configured to emit desaturated radiation toward said back side of said LCD unit, said radiation emitted by said first and second number of LEDs forming a composite desaturated radiation near a target color, said composite radiation being transmitted through selected ones of said number of display elements and maintaining a substantially uniform color therethrough regardless of viewing angle relative to said viewing side of said LCD unit.

10. The backlighting system of claim 9 further including a driver circuit operable to drive said first and second numbers of LEDs.

11. The backlighting system of claim 10 further including a control computer for controlling operation of said driver circuit and said number of display elements of said LCD unit.

12. The backlighting system of claim 9 wherein said target color is a desaturated blue-green color of a vacuum fluorescent display.

13. The backlighting system of claim 9 wherein said first number of LEDs are phosphor doped light emitting diodes.

14. The backlighting system of claim 13 wherein said first number of light emitting diodes are operable to emit white colored desaturated radiation over a first band of spectral frequencies.

15. The backlighting system of claim 14 wherein said second number of light emitting diodes are operable to emit blue-green colored saturated radiation over a second narrower band of spectral frequencies.

16. The backlighting system of claim 9 wherein said first number of LEDs are operable to emit desaturated radiation.

17. The backlighting system of claim 16 wherein said second number of LEDs are operable to emit saturated radiation.

18. A method of backlighting a liquid crystal display unit, comprising the steps of:
   providing a first number of light emitting diodes operable to emit saturated radiation;
   providing a second number of light emitting diodes operable to emit desaturated radiation; and
   directing said saturated radiation from said first number of light emitting diodes and said desaturated radiation from said second number of light emitting diodes toward a liquid crystal display unit to thereby provide backlighting therefore.

19. The method of claim 18 wherein said saturated radiation emitted by said first number of light emitting diodes corresponds to a first narrow band of spectral frequencies;
   and wherein said desaturated radiation emitted by said second number of light emitting diodes corresponds to a second broader band of spectral frequencies, said saturated and desaturated radiation combining to form composite desaturated radiation of a target color.

20. The method of claim 18 wherein said saturated radiation emitted by said first number of light emitting diodes and said desaturated radiation emitted by said second number of LEDs combines to form a desaturated blue-green color of a vacuum fluorescent display.

* * * * *